J. SEMPLE.
FLUID METER.
APPLICATION FILED MAY 15, 1917.
1,247,583.
Patented Nov. 20, 1917.
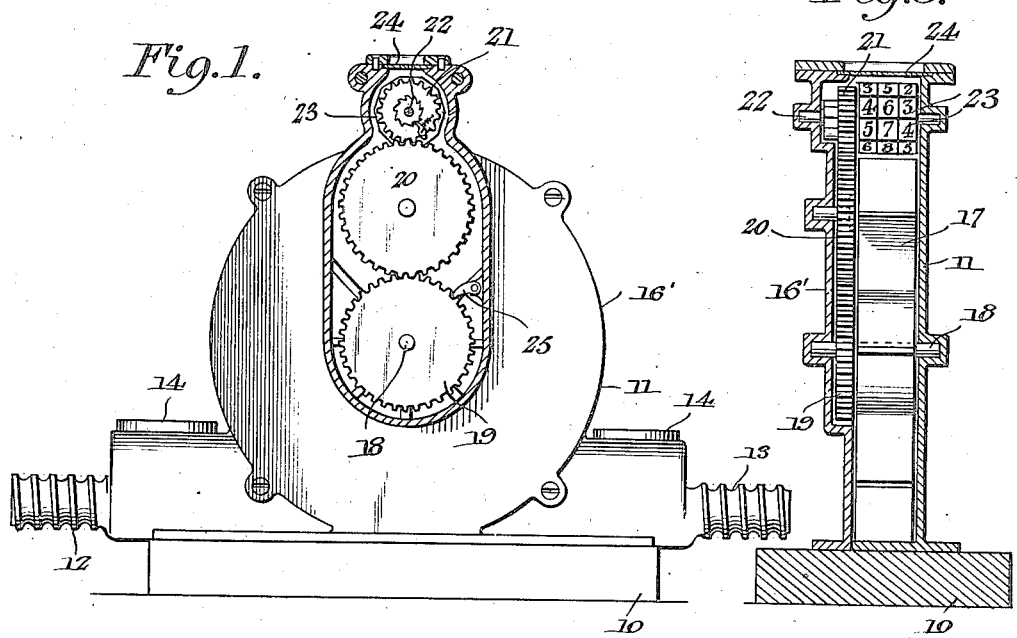
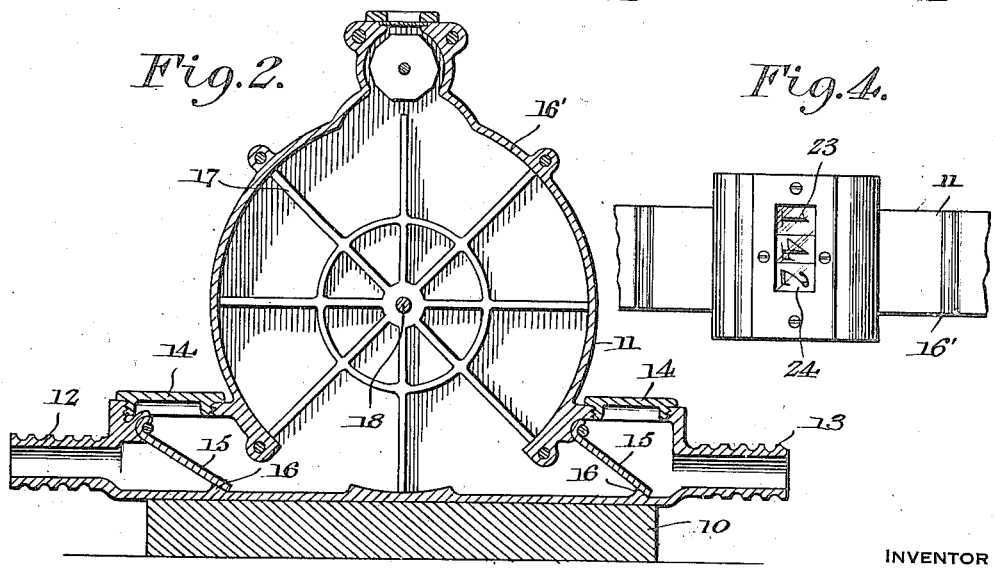
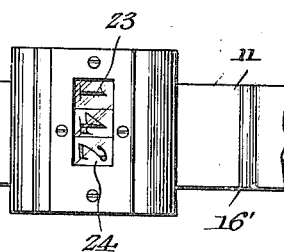
WITNESS
Frederick W. Ely
INVENTOR
James Semple.
BY Victor J. Evans
ATTORNEY

UNITED STATES PATENT OFFICE.

JAMES SEMPLE, OF PHILADELPHIA, PENNSYLVANIA.

FLUID-METER.

1,247,583.   Specification of Letters Patent.   Patented Nov. 20, 1917.

Application filed May 15, 1917. Serial No. 168,738.

*To all whom it may concern:*

Be it known that I, JAMES SEMPLE, a citizen of the United States, residing at 5056 N. 5th St., Philadelphia, in the county of Philadelphia and State of Pennsylvania, have invented new and useful Improvements in Fluid-Meters, of which the following is a specification.

The invention relates to meters and has for an object to provide a meter for registering the amount of fluid passing through a conduit or from one tank to another.

The invention is particularly adapted for use in connection with the distribution of gasolene from the tank wagons of the producing oil companies, to the supply reservoirs or tanks of jobbers, as in the instance of garages, where the producing company delivers to the garage a bulk quantity of gasolene, and the garage owner in turn sells it in small quantities at retail to the consumer.

The usual practice in delivering oil from a tank wagon to the tank of a garage consists in measuring by means of a stick the depth of gasolene in a tank in the garage, and with the capacity of the tank known, determining how many gallons of oil are necessary to fill the tank. In the majority of instances the measuring of the garage tank is done by the driver, or assistant connected with the tank wagon, and ofttimes the estimate as to the amount of gasolene pumped or conducted from the tank wagon to the garage tank is erroneous, due to an error in figuring out how many gallons are needed to fill the tank, and in some instances may be due to an intention on the part of the driver or assistant to falsely measure the quantity of gasolene left in the garage tank, by not allowing the stick to drop all the way down in the tank, thus indicating to the garage owner that the tank may require 150 gallons of gasolene, whereas, in fact, it only requires 100. The driver then arranges the hose from the tank wagon to the garage tank, and instead of allowing 150 gallons to flow into the tank, only allows 100 to flow in, and charges 150 gallons of gasolene against the owner of the garage. Later on the driver removes 50 gallons from the tank wagon in a tank of his own, and consequently sells it at a reduced price to certain other retailers.

With this in mind and various other procedures that can readily be followed out in the transfer of gasolene from the tank wagon to a garage tank, whereby the garage owner does not receive the full quantity of gasolene for which he is charged it will be apparent that the use of a meter by the garage owner on the conduit that carries the gasolene from the tank wagon to the garage tank, will enable the garage owner to determine just how many gallons he is receiving, and it is the purpose of this invention to provide such a device so that the owner of the garage can check the amount of gasolene delivered, with the amount stated by the driver to have been delivered.

In the further disclosure of the invention reference is to be had to the accompanying drawings, constituting a part of this specification, in which similar characters of reference denote corresponding parts in all the views, and in which—

Figure 1 is a side elevation of the meter with a portion of the casing broken away to disclose the underlying structure.

Fig. 2 is a vertical longitudinal sectional view taken through the meter.

Fig. 3 is a vertical transverse sectional view taken through the meter.

Fig. 4 is a fragmentary enlarged plan view of the registering apparatus.

Referring more particularly to the views, 10 indicates a suitable base for a casing 11 which may or may not be made of a number of assembled parts, and which has an inlet 12 and an outlet 13, the hose from the tank wagon being adapted to be connected at the inlet 12 in any suitable manner, and the hose to the garage tank being adapted to be connected in any suitable manner to the outlet 13. Suitable removable caps 14 are provided so that access can be had to the interior of the casing 11, and flap leaves 15 are pivoted to swing in the casing and normally repose upon seats 16, said leaves being disposed one adjacent the inlet and one adjacent the inner end of the outlet, to check or reduce the rate of flow of the incoming or outgoing fluid, so that the speed of flow will not result in erroneous registering, as will be clearly understood hereinafter.

Journaled within the casing, in a circular portion 16' thereof, is a paddle wheel 17 which is adapted to rotate within the casing, the paddle wheel being carried on a shaft 18 which has keyed thereto a toothed wheel 19 meshing with a gear wheel 20, and which in turn meshes with a toothed wheel 21 carried on a shaft 22, on which is arranged a suitable number of rotating elements 23 bearing numerals, and which, in fact, are in the nature of a cyclometer. The upper end of the casing in which the cyclometer is carried has a glass top 24, so that the numerals on the cyclometer can be easily read, and it will be seen that the toothed wheel 19 is engaged by a pawl 25, preventing rotation of the toothed wheel in a clockwise direction, the paddle wheel 17 being adapted to operate in an anti-clockwise direction, as is also the toothed wheel 19.

In operation, gasolene or other fluid passes into the casing 11 by way of the check valve controlled inlet port 12, whence it is conducted into the circular chamber 16' of the casing, so as to engage with the radial vanes of the wheel 17. The pressure or thrust of the fluid upon said wheel causes the latter to revolve in the anti-clockwise direction above referred to, so as to rotate the shaft 18 and its connected gear 19, which, through the chain of gearing 20 and 21, effects the operation of the registering mechanism 23. The wheel 17 is so proportioned that a complete rotation thereof will result in registering one gallon of fluid, although it will be understood that this feature may be departed from if found expedient. The outer extremities of the vanes of the wheel 17 are closely situated with respect to the wall of the chamber 16' so that the seepage of fluid therebetween will be substantially prevented. The valves 15 are so constructed as to prevent the back-flow of fluid through the meter, so as to prevent undue actuation of the registering mechanism.

From the foregoing it will be seen that there is provided a measuring device whereby the objects of the present invention have been achieved, and that all of the advantageous features above mentioned are, among others, present. The meter is simple in construction, of but relatively few parts, and not likely to become out of order, so as to occasion repairs, but in the event of certain parts thereof becoming disordered, the trouble may be quickly and easily disclosed and overcome, by reason of the general accessibility of all of the elements of the meter. It is thought that the advantages attendant to the use of this meter, in the capacity mentioned in the prelusory of this specification will be clearly perceived, and therefore a more extended explanation relative to its operation and utility will be accordingly omitted.

It is to be understood that the device can be made sufficiently compact to be used on an automobile to indicate the amount of gasolene taken from the tank and consumed by the motor, and it will also be clearly apparent that even though the vanes of the wheel 17 are not sufficiently close to the wall of the casing to prevent seepage within the casing, the device will register properly, for the reason that in the flow of fluid from a casing such as described, there could naturally be only as much fluid coming out as there is going in, and thus counting the contents as a gallon, each revolution of the paddle would result in a gallon of the fluid passing out.

I claim:

A device of the class described comprising a base part having inlet and outlet ports therein, flaps controlling said ports, removable covers for providing access to said flaps, a casing connected with said base, a paddle wheel in said casing extending into said base, registering mechanism located in the top of the casing above the paddle wheel, gear wheels connecting said paddle wheel with said registering mechanism, and means for preventing rearward movement of the paddle wheel.

In testimony whereof I affix my signature.

JAMES SEMPLE.